United States Patent
Gschwindt et al.

(10) Patent No.: US 6,923,154 B2
(45) Date of Patent: Aug. 2, 2005

(54) INTERNAL COMBUSTION ENGINE COMPRISING A CYLINDER CRANKCASE

(75) Inventors: Werner Gschwindt, Sternenfels (DE); Thomas Wasserbaech, Keltern (DE)

(73) Assignee: Ing. h.c.F. Porsche AG, Stuttgart (DE)

( * ) Notice: Subject to any disclaimer, the term of this patent is extended or adjusted under 35 U.S.C. 154(b) by 50 days.

(21) Appl. No.: 10/468,037

(22) PCT Filed: Jan. 23, 2002

(86) PCT No.: PCT/EP02/00630

§ 371 (c)(1),
(2), (4) Date: Aug. 14, 2003

(87) PCT Pub. No.: WO02/066795

PCT Pub. Date: Aug. 29, 2002

(65) Prior Publication Data

US 2004/0149250 A1 Aug. 5, 2004

(30) Foreign Application Priority Data

Feb. 17, 2001 (DE) ............................... 101 07 534

(51) Int. Cl.⁷ ................................................ F02F 7/00
(52) U.S. Cl. ................................................ 123/195 C
(58) Field of Search ........................ 123/195 R, 195 C, 123/196 R

(56) References Cited

U.S. PATENT DOCUMENTS

| 4,607,601 A | 8/1986 | Kohler | |
| 6,325,033 B1 * | 12/2001 | Iwata | 123/90.31 |
| 6,766,714 B2 * | 7/2004 | Iwata et al. | 74/606 R |

FOREIGN PATENT DOCUMENTS

| EP | 0590453 A1 | 9/1993 | |
| JP | 4-269324 * | 9/1992 | F01P/5/10 |
| JP | 08200088 A | 1/1995 | |
| JP | 10131734 A | 5/1998 | |

* cited by examiner

Primary Examiner—Thomas Moulis
(74) Attorney, Agent, or Firm—Crowell & Moring LLP

(57) ABSTRACT

An internal-combustion engine has a cylinder block and crankcase and a case structure which preferably has two cylinders or cylinder bank rows arranged in a V-shape with respect to one another. An endless drive extends on the face of the cylinders or cylinder bank rows, which drive comprises a timing chain for connecting a crankshaft with camshafts arranged in the cylinder heads. The timing drive chain is covered by a timing drive cover. The timing drive cover, or the case is structure situated opposite the timing drive, cover has a ribbing by which a targeted separation and/or return takes place of the oil carried along by the timing chain in the direction of the cylinder heads. As a result, among others, the venting of the crankcase is not hindered, which takes place by way of the timing chain case.

6 Claims, 3 Drawing Sheets

INTERNAL COMBUSTION ENGINE COMPRISING A CYLINDER CRANKCASE

BACKGROUND AND SUMMARY OF THE INVENTION

The invention relates to an internal-combustion engine having a cylinder block and crankcase comprising a case structure which has at least two cylinders or cylinder bank rows arranged in a V-shape with respect to one another, an endless drive extending on a face of the cylinders or cylinder bank rows, which drive comprises a timing chain, for connecting a crankshaft with camshafts arranged in cylinder heads, the timing chain being covered by a timing drive cover.

From Japanese Patent Document JP 8-200088 A, a timing chain case for an internal-combustion engine is known which has an interior rib structure by way of which, among other things, an oil guiding duct is formed which is directed to the crankshaft and by means of which the oil splashing around in the chain case is collected.

It is an object of the invention to provide devices for cylinders preferably arranged in a V-shape with respect to one another, by which devices the lubricating oil carried along by a timing chain for the camshaft drive is returned in a targeted manner to the oil pan of the internal-combustion engine.

This object is achieved in that the timing drive cover, or the case structure situated opposite the timing drive cover, has a ribbing by way of which a targeted separation or return takes place of oil carried along by the timing chain in a direction of the cylinder heads.

As a result of the ribbing according to the invention, a portion of the lubricating oil carried along by the timing chain in the direction of the cylinder heads is wiped off at several points within the timing chain case and is returned in a targeted manner to the oil pan of the internal-combustion engine. As a result of the controlled separation of the lubricating oil, the cross-section, among others, in the timing chain case can be kept free for the flowing-off of the crankcase gases, the so-called blow-by gases.

Further advantageous developments and improvements of the internal-combustion engine according to the invention can be achieved as a result of the measures indicated in the subclaims.

By way of a U-shaped deflection rail, the end of the timing chain extending between the two cylinder heads and above the crankshaft is guided closely along a main rib. The lubricating oil carried along by the timing chain is carried along on the main rib to an oil return flow opening arranged in the apex area of the main rib, before it returns by way of the return flow opening in the oil pan of the internal-combustion engine.

The main rib is adjoined on the left and on the right by one ribbing structure respectively which consists of several partial ribs and, in the case of which, the individual partial ribs are used as an oil guiding duct or for wiping off the lubricating oil carried along by the timing chain.

The ribbing is advantageously arranged on the interior side of the timing drive cover and therefore simultaneously contributes to the reinforcement of the timing drive cover.

An embodiment of the invention is illustrated in the drawings and will be described in detail in the following.

DETAILED DESCRIPTION OF THE DRAWINGS

Figure 1:
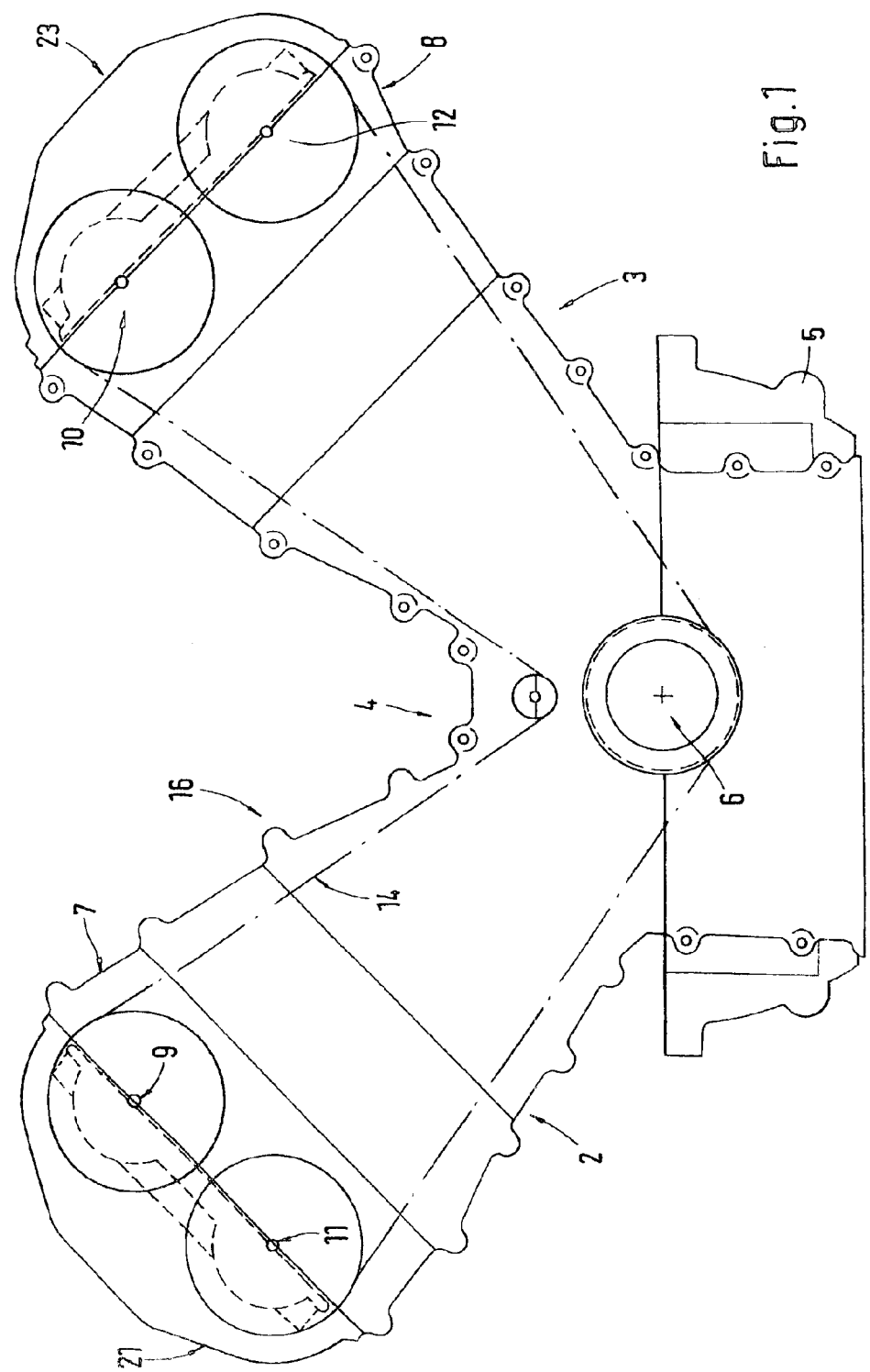
FIG. 1 shows a frontal view of the internal-combustion engine.

An internal-combustion engine with several cylinders has two cylinder bank rows 2 and 3 which are situated opposite one another in a V-shape. The two cylinder bank rows 2 and 3 are integrated in a crankcase top half 4 which is adjoined by the crankcase bottom half 5 further developed as a crankshaft bearing bridge. A crankshaft 6 is disposed between the crankcase top half 4 and the crankcase bottom half 5. The two cylinder bank rows 2 and 3 have two cylinder heads 7 and 8 in which, among others, the inlet camshafts 9 and 10 as well as the outlet camshafts 11 and 12 provided for controlling the inlet and outlet valves respectively are accommodated. The inlet camshafts 9, 10 and the outlet camshafts 11, 12 are driven by way of a driving double gear, which is arranged on the crankshaft 6, and a timing chain 14, a so-called double roller chain, which is constructed as an endless drive. The timing drive for the camshafts is arranged on a face 16 of the housing structure of the internal-combustion combustion engine which is essentially completely closed off by a timing drive cover 18. The latter is screwed to the crankcase top half 4 and to the crankcase bottom half 5. For this purpose, holding eyes 20 are provided at the timing drive cover 18, in which, in the mounted condition, fastening screws are received which are not shown. The two cylinder heads 7 and 8 are closed off in the upward direction by one cylinder head cover 21 and 23, respectively.

Figure 2:
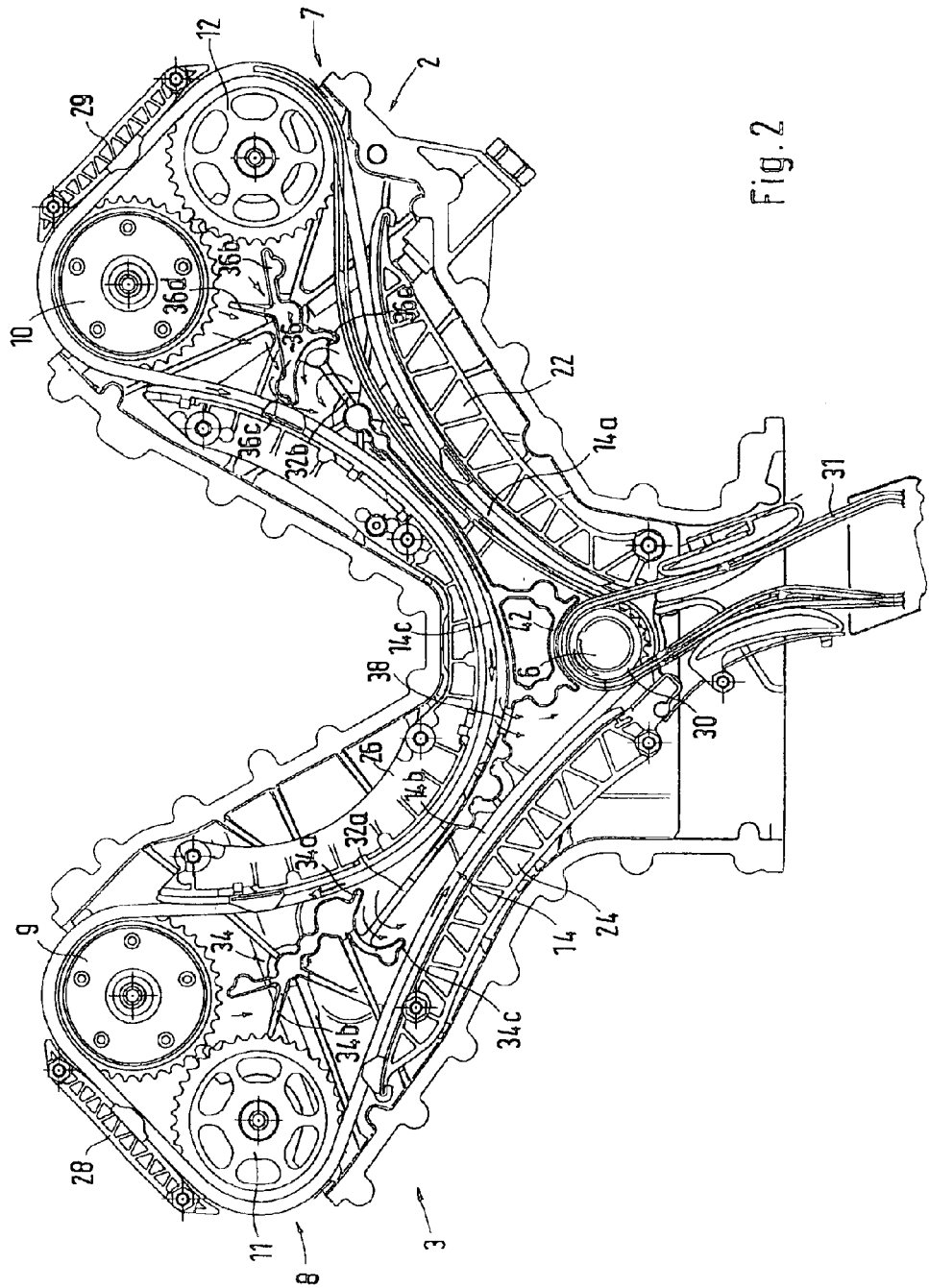
FIG. 2 shows a view of the timing drive of the internal-combustion engine.
Figure 3:
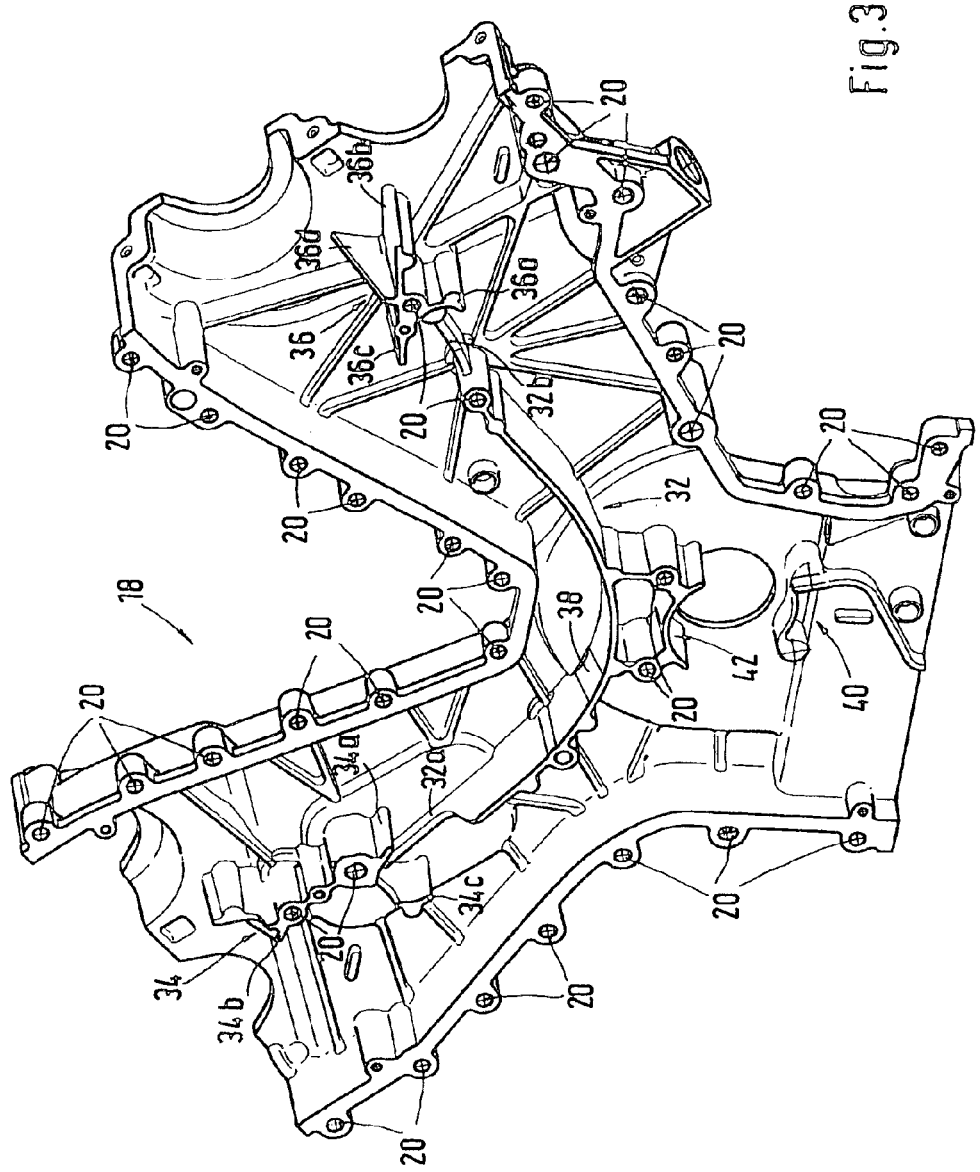
FIG. 3 shows a perspective view of the timing drive gear cover of the internal-combustion engine.

As illustrated in FIG. 2, the timing chain 14 is bounded by several slide or guide rails. For this purpose, in the left cylinder bank row 2, the loose end 14a of the timing chain 14 running up to the outlet camshaft 12 is acted upon by a slide rail 22, while, in the right cylinder bank row 3, the load end 14b of the timing chain 14 leading by way of the outlet camshaft 11 to the crankshaft 6 is bounded by the slide rail 24. The inner end 14c of the timing chain 14 leading from the inlet camshaft 10 of cylinder bank row 2 to the inlet camshaft 9 of cylinder bank row 3 is bounded or guided by a deflecting rail 26 constructed in a U-shape. Two additional guide rails 28 and 29 for the timing chain 14 are provided above the inlet camshaft 9 and the outlet camshaft 11 and above the inlet camshaft 10 and the outlet camshaft 12, respectively.

On the crankshaft 6, another driving gear 30 is provided which is connected by way of a driving chain 31 with a driving gear, which is not shown, of an oil pump arranged in the oil pan of the internal-combustion engine.

During the operation of the internal-combustion engine, it is a problem that, by way of the driving chain 31 and the timing chain 14, lubricating oil is carried along out of the oil pan of the internal-combustion engine and is transported into the cylinder heads 7 and 8, and that a portion of the lubricating oil swirls around in the timing chain case bounded by the timing drive cover 18. A certain lubrication of the drive chains 14 and 31 as well as of the camshaft gears is definitely desirable, but an excessive amount of lubricating oil in the timing drive has the result that, for example, the free cross-section in the timing chain case required for the flowing-off of the crankcase gases will no longer be available.

For the targeted oil separation or oil retention of the lubricating oil carried along particularly by the timing chain 14, an inner rib structure is provided in the timing drive cover 18, by way of which rib structure, a targeted oil separation and thus a lubricating oil guidance in the timing chain case of the internal-combustion engine can be achieved. For this purpose, a main rib 32 is provided on the interior side of the timing drive cover 18, which main rib 32 extends inside the timing chain 14 constructed as an endless drive, in a curved manner in the direction of the cylinder heads 7 and 8. The main rib 32 is continued in the direction of the two cylinder heads 7 and 8 by way of a rib section 32a and 32b tapering in the web width, which is adjoined in the direction of the camshaft gears by a ribbing structure 34 and 36 consisting of several partial ribs 34a to 34c and 36a to 36c, whose method of operation will be explained in detail in the following. For the oil return, the main rib 32 has a lubricating oil return opening 38 in its apex area.

By way of the oil pump driving chain 31, lubricating oil situated in the oil pan of the internal-combustion engine is transported into the timing drive of the internal-combustion engine. Because of the running direction of the timing chain 14, a large portion of this engine lubricating oil is transported by way of the loose end 14a of the timing chain 14 in the direction of the cylinder head 7. However, a portion of the lubricating oil carried along with the timing chain 14 is "planed off" on the partial rib 36a and, as illustrated by way of the arrows, is deflected in the area of the rib section 32b onto the inner end 14c of the timing chain 14 and is carried along in order to then be able to drip off or flow off on the main rib 32. The lubricating oil will then flow on the main rib 32 to the lubricating oil return flow opening 38 and is returned from there into the oil sump or into the oil pan of the internal-combustion engine.

The portion of the lubricating oil which was not wiped off by the partial rib 36a can be utilized particularly for the lubricating oil supply of the camshaft gears of the camshafts 10 and 12. The lubricating oil dripping off the camshaft gears, as illustrated by way of the arrows, is collected by the partial ribs 36b and 36c, so that also this portion of the lubricating oil is guided by way of the inner end 14c of the timing chain 14 to the main rib 32. The web width of the partial rib 36d used only for reinforcing the timing drive cover 18 tapers in the direction of the crankcase wall situated opposite the timing drive cover 18, so that, as illustrated by way of the arrow, in the case of a position of the internal-combustion engine installed inclined against the driving direction, the lubricating oil flowing off on the partial rib 36b will arrive at the partial rib 36c by way of the rib 36d. From there, as explained above, the lubricating oil is guided by way of the inner end 14c of the timing chain 14 to the main rib 32 and can then also flow off by way of the return flow opening 38 into the oil pan.

On the other side of the timing drive cover 18, analogously by way of the partial rib 34a, the lubricating oil carried along in the direction of the cylinder head 8 by way of the interior end 14c of the timing chain 14 is "planed off" and, in the area of the rib section 32a, is deflected by the curved partial rib 34c to the load end 14b of the timing chain 14 running downward in the direction of the crankshaft 6. The lubricating oil dripping off the camshaft gears of the camshafts 9 and 11 is collected by the partial rib 34b and can then also drip off in a targeted manner onto the load end 14b of the timing chain 14.

An oil guiding rib 40 arranged below the crankshaft bearing provides that lubricating oil situated in this area is drained off into the oil pain and does not arrive on the loose end 14a of the driving chain 31.

A guide rib 42 provided above the crankshaft bearing in the timing drive cover 18 provides a shielding of the timing chain driving gear and of the oil pump driving gear.

As a result of the indicated measures, the oil mist in the timing chain case is reduced and the venting of the crankcase with respect to blow-by gases is facilitated.

What is claimed is:

1. An internal-combustion engine having a cylinder block and crankcase, comprising:
    a case structure which has at least two cylinders or cylinder bank rows arranged in a V-shape with respect to one another, and
    an endless drive extending on a face of the cylinders or cylinder bank rows, which drive comprises a timing chain, for connecting a crankshaft with camshafts arranged in cylinder heads, the timing chain being covered by a timing drive cover,
    wherein the timing drive cover or the case structure situated opposite the timing drive cover has a ribbing by way of which a targeted separation or return takes place of oil carried along by the timing chain in a direction of the cylinder heads,
    wherein the ribbing has a main rib which extends within the timing chain in a curved shape in the direction of the cylinder heads, at least one oil return opening being provided in an apex area of the main rib, and
    wherein two ends of the main rib are adjoined by a ribbing structure comprising several partial ribs, individually, the partial ribs serving as an oil guiding or oil collecting duct for oil flowing back from camshaft driving wheels.

2. The internal-combustion engine according to claim 1, wherein the individual partial ribs are provided for wiping off oil.

3. The internal-combustion engine according to claim 1, wherein the ribbing is arranged on an interior side of the timing drive cover.

4. The internal-combustion engine according to claim 2, wherein the ribbing is arranged on an interior side of the timing drive cover.

5. An engine for a motor vehicle, comprising:
    a cylinder block,
    a crank case,
    a case structure with cylinders arranged in a V-shape,
    a timing chain arranged on a face of the case structure,
    a timing drive cover, and
    ribbing arranged on the timing drive cover,
    wherein the ribbing has a main rib which extends within the timing chain in a curved shape in the direction of the cylinder heads, at least one oil return opening being provided in an apex area of the main rib, and
    wherein two ends of the main rib are adjoined by a ribbing structure comprising several partial ribs, individually the partial ribs serving as an oil guiding or oil collecting duct for oil flowing back from camshaft driving wheels.

6. A method of making an internal-combustion engine having a crankcase and a cylinder block, comprising:
    providing a case structure having at least two cylinders or cylinder bank rows arranged in a V-shape,
    connecting a crankshaft with camshafts arranged in cylinder heads via an endless drive extending on a face of the cylinders or cylinder bank rows, the endless drive comprising a timing chain,
    covering the timing chain with a timing drive cover,
    arranging a ribbing on the timing drive cover or the case structure in order to operatively provide a targeted separation or return of oil carried along by the timing chain in a direction of the cylinder heads, wherein the ribbing has a main rib which extends within the timing chain in a curved shape in the direction of the cylinder heads, at least one oil return opening being provided in an apex area of the main rib, and wherein two ends of the main rib are adjoined by a ribbing structure comprising several partial ribs, individually, the partial ribs serving as an oil guiding or oil collecting duct for oil flowing back from camshaft driving wheels.

* * * * *